Nov. 15, 1960   A. G. BODINE, JR   2,960,317
APPARATUS FOR GENERATING AND TRANSMITTING SONIC VIBRATIONS
Filed Nov. 6, 1958   3 Sheets-Sheet 1
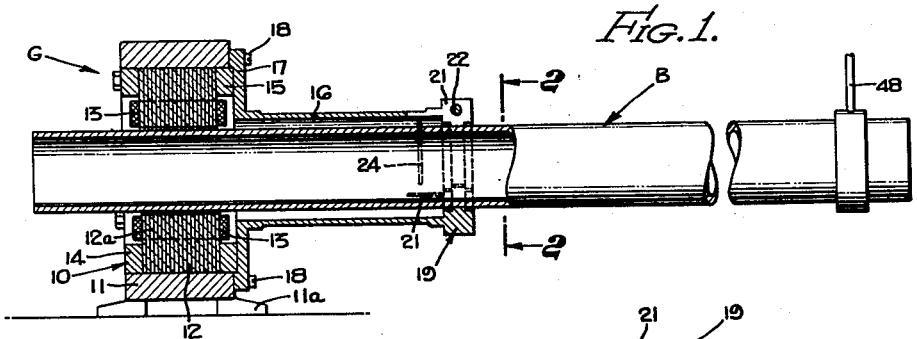
Fig. 1.
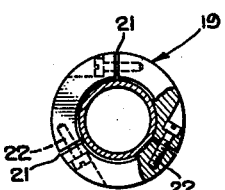
Fig. 2.
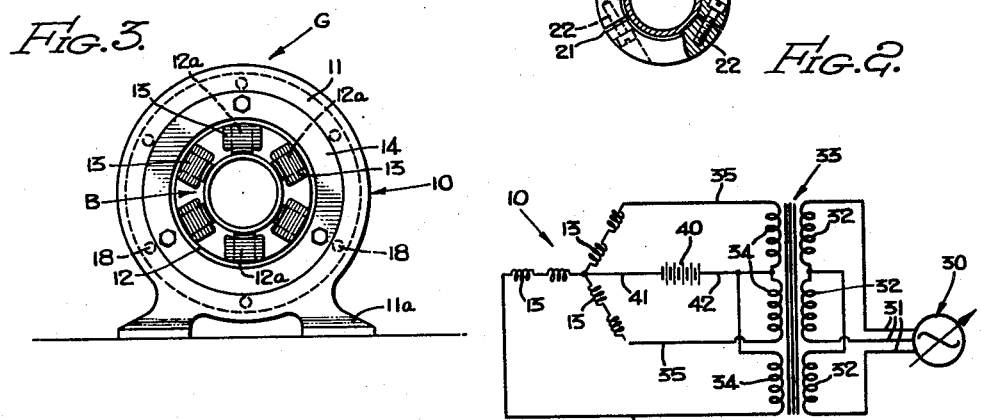
Fig. 3.
Fig. 4.
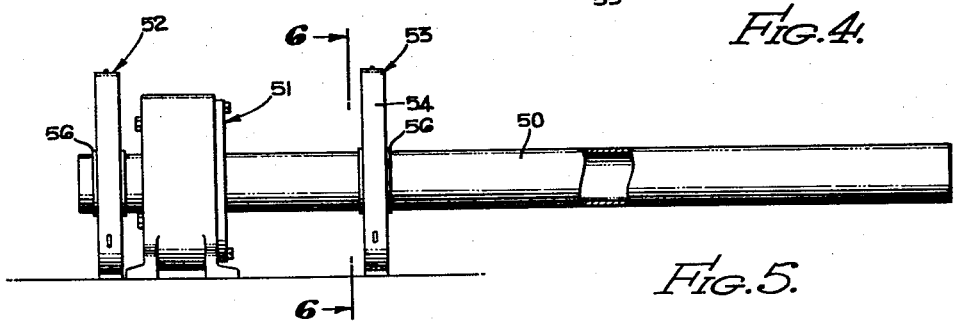
Fig. 5.
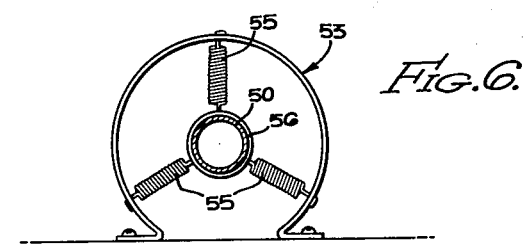
Fig. 6.
INVENTOR.
ALBERT G. BODINE, JR.
BY
ATTORNEY Nov. 15, 1960  A. G. BODINE, JR  2,960,317
APPARATUS FOR GENERATING AND TRANSMITTING SONIC VIBRATIONS
Filed Nov. 6, 1958  3 Sheets-Sheet 2

INVENTOR.
ALBERT G. BODINE, JR.
BY
ATTORNEY

INVENTOR.
ALBERT G. BODINE, JR.
BY
ATTORNEY

United States Patent Office 2,960,317
Patented Nov. 15, 1960

2,960,317

APPARATUS FOR GENERATING AND TRANSMITTING SONIC VIBRATIONS

Albert G. Bodine, Jr., 13120 Moorpark St., Sherman Oaks, Calif.

Filed Nov. 6, 1958, Ser. No. 772,270

3 Claims. (Cl. 259—1)

This invention relates generally to apparatus for the generation and transmission of relatively high power by means of intense sonic vibrations.

This application is a continuation-in-part of my prior co-pending applications as follows: Serial No. 313,175, filed October 4, 1952, for Method and Apparatus For Generating and Transmitting Sonic Vibrations, allowed April 14, 1958, now abandoned; Serial No. 771,808, filed September 2, 1947, entitled Apparatus for Boundary Layer Control, now abandoned; and Serial No. 484,627, filed January 28, 1955, entitled Apparatus for Generating and Transmitting Sonic Vibrations, now abondoned.

A number of industrial uses for such vibrations have been discovered. It is known, for example, that intense sonic energy may be applied to gases, liquids or solids to produce certain desired physical or chemical effects. Many such industrial uses are known and described in the literature and need not be further discussed.

A number of the applications which have been proposed have been handicapped, however, by the limitations of sonic generators heretofore known. Sonic generators or transducers and the associated equipment as heretofore known have been characterized by complexity and relatively high cost. The efficiency of transduction has been characteristically low. The power of previously known generators has been relatively low, particularly at the higher frequencies; and the ruggedness required of an industrial machine has been lacking.

It is accordingly the primary general object of the present invention to provide novel and improved sonic vibration generating apparatus particularly suited to various industrial applications and characterized by relatively high power output, efficiency of transduction, simplicity and ruggedness.

A further object, and another aspect of the invention, comprises the provision of means for mechanically transmitting increased amounts of generated sonic power to a work point distant from the generator.

A still further object is the provision of apparatus for utilizing sonic vibrations to achieve, on an industrial scale, results heretofore obtained only in the laboratory.

A further and more particular object of the invention is to provide improved sonic generating and transmission apparatus for the continuous and uniform treatment of fluids or liquids by sonic vibrations.

The present invention is based upon the fact that an elastic bar, properly supported, can be subjected to transverse vibration simultaneously in two directions at right angles, that is, in a manner such that a free end of the bar describes a closed path, which is the resultant of two rectilinear transverse components of vibration. If the bar is of circular section, and the two components are in quadrature and of equal amplitude, the free end describes a circle. If the two components in quadrature are of unequal amplitude, the free end will describe an ellipse. It can readily be seen that the effect of the two quadrature vibratory components is a roating radially directed force vector which moves the portion of the bar acted upon in a circle, but, of course, without turning the bar bodily on its axis. The advantage of so setting up a rotating or gyratory deflection of the bar at the point of vibration generation, as compared with a simple uni-directionally transverse vibration, is that for a given amplitude of lateral deflection, a bar so vibrating receives, transmits and delivers twice as much sonic power as in the case of unidirectional transverse vibration.

Transverse gyratory vibration of an elastic bar of the character indicated results in propagation of an elastic gyratory transverse wave in a direction longitudinally of the elastic bar, each transverse section of the bar remaining in its own plane, and successive transverse sections undergoing gyratory transverse elastic deflection. It can be seen that such elastic wave propagation longitudinally of the bar permits vibratory energy to be taken off from the end of the bar remote from the end at which the vibrations are imparted to the bar.

The invention in a number of typical embodiments will now be described in more detail, reference for this purpose being had to the accompanying drawings, in which:

Figure 1 is a side elevation, partly in section, showing one preferred embodiment of the invention;

Figure 2 is a transverse section on line 2—2 of Figure 1;

Figure 3 is an end elevation of the stator of the embodiment of Figure 1;

Figure 4 is a schematic electrical circuit used with the embodiment of Figures 1–3;

Figure 5 is a side elevational view of a modified form of the invention;

Figure 6 is a section taken on line 6—6 of Figure 5;

Figure 7:
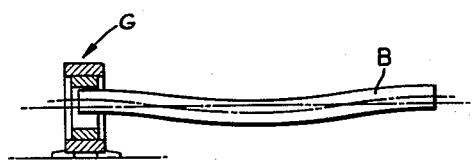
Figure 7 is a somewhat diagrammatic view showing one mode of standing wave obtainable with the invention.

Referring first to the embodiment of the invention shown in Figures 1 to 4, the apparatus comprises, first, a gyratory force generator G and, second, an elastic bar B, in this instance a tube, of circular cross-section, and understood to be fabricated of material of good elastic fatigue properties such as steel. Also, in the case of Figures 1 to 4, the tube B is of a paramagnetic material, which requirement is, of course, supplied if the tube is of steel. Broadly, and for the purpose of the broader claims, the term bar will be used for the member B, whether said member is solid or tubular.

The generator G comprises a stator 10 surrounding one end portion of the tube B, and this stator is similar to the stator of a salient pole type polyphase induction motor. It is composed of a frame 11 in which are mounted an iron core composed of laminated iron rings 12 providing, in this instance, six pole pieces 12a for pole windings 13. The laminated core is secured in assembly by means of end rings 14 and 15 suitably mounted inside frame 11. Frame 11 is shown as provided with feet 11a by which it may be firmly mounted on a suitable support. No limitation is, of course, to be inferred from the particular stator construction shown, any stator designed for polyphase winding being satisfactory if designed to produce a rotating magnetic field of the necessary flux density and frequency. The pole windings 13 are energized by a polyphase current source, as later set forth.

The tube B is received at one end portion within the stator 10, preferably at only sufficient spacing from the pole tips of the stator to assure clearance at all vibration amplitudes, and is provided with a compliant support. As here shown, it is supported directly from the stator through the medium of a surrounding compliant sleeve 16 attached to the stator frame 11 as by means of an outwardly extending annular flange 17 and attaching screws 18. The projecting end of the sleeve 16 is formed with an enlarged clamping ring or collar 19 which engages and rigidly clamps the tube B. As a convenient and preferred clamping expedient, the end portion of the sleeve 16, as well as collar 19, may be radially split as at 21 and clamping screws 22 used to contract the collar 19 about the tube B. The sleeve 16 must firmly hold the tube B, and yet be sufficiently compliant to permit movement of the tube at the clamping point, since certain later-mentioned nodes and antinodes will shift along the tube at different vibration frequencies, and any clamping point selected will almost inevitably experience movement at one or more frequencies. The compliance of the supporting sleeve 16 may be considerably enhanced, if desired, for instance, by providing it with circumferential slots 24 located near its free end.

The point of engagement of the tube B by the clamping collar 19 is preferably at a node of a standing wave set up in the tube when vibrating in its fundamental resonant mode, such as a node being found approximately one-quarter of the length of the tube from each of its ends. In the present instance, therefore, collar 19 supports the tube B at a point substantially one-quarter of its length from its driven end, i.e., its end associated with the stator 10. Other points of support are, of course, possible, e.g., nodal points encountered in various higher modes of vibration, though in view of the compliant character of the support, it is not actually essential that the point of support be located at any node point.

In Figure 4 the numeral 30 indicates a variable frequency source of high frequency polyphase electric current. An electric alternator wound to generate high frequency current and capable of being driven throughout an appropriate speed range, a variable frequency electronic oscillator, or any other source of variable high frequency alternating current may be used. If the internal impedance of this source does not sufficiently match the impedance of the stator coils, an impedance matching transformer may be employed. Thus, as here shown, the current from source 30 is supplied by leads 31 to the Y-connected power coils 32 of impedance matching transformer 33. Current is delivered from the load coils 34 of the transformer by leads 35 to the Y-connected windings 13 of stator 10. Thus, the two series connected windings 13 of each phase are placed on 180° opposed pole pieces of the stator. In the particular form illustrated three-phase current is indicated, although any number of phases may be used to provide the necessary rotating magnetic field in the stator.

For a reason which will presently appear, the stator coils in this embodiment of the invention are polarized. While this may be accomplished in various ways, one preferred method will be explained. One terminal of a source of direct current such as a battery 40 is connected by a lead 41 to the neutral point of the Y winding of the stator coils 13. The other battery terminal is connected by a lead 42 to the neutral point of the Y winding of the transformer coils 34. Battery 40 supplies the stator winding 13 with a constant current which exceeds, or at least equals, the maximum value of the current supplied by the alternator, thus producing a net current which is constant in direction of flow but undulating in magnitude. This arrangement permits the magnetic flux in the poles of the stator to fluctuate in strength but prevents the cyclic reversal in polarity which characterizes the stator winding of an ordinary induction motor. Each pole is thus maintained constant in polarity by the direct current component of its excitation but is varied in strength by the alternating current component of its excitation. As each pole in turn reaches its maximum strength, the pole on the opposite side of the stator is at minimum strength, thus creating for the moment a region of high flux density near the stronger pole. An instant later, the next adjoining pole in the direction of field rotation becomes the strongest pole and the region of maximum field strength moves into its vicinity. As the polyphase alternating current continues to vary the strength of each pole in sequence, the region of maximum field strength moves from pole to pole around the circumference of the space within the stator. The paramagnetic tube accordingly experiences a force or bending moment tending to move it into the region of maximum field strength, and is deflected laterally or radially first toward one pole and then toward the next. Thus, the section of the tube which passes through the stator is subjected to a rotating radially directed force vector which moves it in a circular path around the stator area.

Another manner of placing the pairs of pole windings 13 on the pole pieces 12a will be described, reference being again directed to Figs. 3 and 4. In this case, the two windings 13 of one phase of the Y are placed on two adjacent pole pieces, the two windings 13 of a second phase are placed on the next two adjacent pole pieces, and the two windings 13 of the third phase are placed on the remaining two adjacent pole pieces, the directions of the windings being always such as to give alternately north and south polarities to successive pole pieces.

It is again found preferable to polarize the windings with a direct current, using battery 40 in the neutral lead 41 of the Y-connected stator coils. Battery 40 again supplies the stator coils 13 with a constant direct current which exceeds, or at least equals, the maximum effective value of the current supplied by the alternator, thus producing a net effective current in each pair of adjacent stator coils 13 which is constant in direction of flow but undulating in amplitude. The two series connected windings 13 of the two members of each pair of pole pieces being in opposite directions, so as to give unlike polarities, the magnetic field circuit extends between the pole faces, and the field strength in this region is undulatory in correspondence with the alternating energizing current of the corresponding phase of the system. It will be clear that the field strengths of the three pairs of pole pieces will vary or undulate with 120° phase difference. In consequence, the bar B is successively moved, i.e., elastically displaced, by magnetic attraction toward successive pairs of pole pieces as the field strengths therebetween pass through their maximum values. The bar is thus first moved toward one pair of the pole pieces, then toward the second, and then toward the third, and thus gyrates about a longitudinal axis. The three phase field thus exerts a turning, a radially oriented deforming force or force vector on the elastic bar.

It is preferable, and a feature of the invention, that the device be operated at resonance. If the frequency of the gyrating vibration corresponds to the fundamental resonance frequency of the tube for longitudinally propagated transverse waves, the tube will gyrate with substantial amplitude in the mode shown with some exaggeration in Figure 7. The vibratory action is transmitted down the length of the tube, reflected from the end thereof, and through interference between the transmitted wave and the reflected wave, a resonant gyratory standing wave is established as indicated. When vibrating at the fundamental mode, nodal points, i.e., points of minimized deflection amplitude, occur at sections approximately one-fourth the length of the tube from each end of the tube, and these sections accordingly do not move appreciably and are desirable points for clamping. Antinodal points, where deflection amplitude is maximized, occur along the tube at quarter-wave length distances from the nodes.

Figure 8:
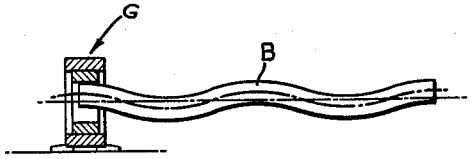
Figure 8 is a view similar to Figure 7 but showing another form of standing wave.

If the frequency of the rotating field is now increased somewhat, the amplitude of vibration is perceptibly less than that obtainable at resonance, but very strong waves are still generated in the tube. It is not apparent what positions the tube assumes when vibrated at other than resonant frequencies. Nevertheless, in actual operation, with a typical embodiment of the dimensions heretofore indicated, very substantial power outputs are achieved at all frequencies in and above the audible range. As the frequency of the rotating field is then still further increased, the second resonance point is reached, and the tube gyrates in the manner illustrated in Figure 8. It may be noted from Figures 7 and 8 that the nodal point sections of the tube or bar are different for the two different frequencies. It is for this reason that the clamping support must be sufficiently flexible to permit some lateral movement of the tube.

Further resonance points are of course found as the angular velocity of the rotating field is further increased. At these resonant points, substantial energy flows into the tube, and is transmitted by the tube to any fluid or solid with which the tube may be in contact, or through appliance 48, to any body which is to be vibrated. As already indicated, however, a particular virtue of the generator is that the resonance points are not critical, and furthermore, substantial power output is attained at other than resonance frequencies. Under these nonresonant conditions, the initial wave propagated along the bar is reflected from the ends thereof to yield a resultant wave pattern which is of substantial amplitude. It will be evident that in operation the sections of the tube which gyrate about its longitudinal axis will experience a substantial centrifugal force. The opposing centripetal force is derived for the most part from elasticity of the deformed tube, though the elasticity of the compliant mounting may also contribute to whatever extent the latter may be deformed.

While the embodiment of my invention as above described and explained makes use of a steel tube, a solid steel or iron rod vibrates in a similar manner.

I have further discovered that a tube or bar of electrically conductive material vibrates in similar mode, apparently because of eddy currents instead of magnetic attractions. When a nonferrous metal is used for the vibrating tube the direct current bias is unnecessary. The circuit shown in Figure 4 may be used with battery 40 and leads 41 and 42 omitted. Nonferrous tubes are found to vibrate satisfactorily when mounted in a very light, highly compliant manner. In Figure 5 a tube 50 of some nonferrous metal such as brass is shown passing concentrically through a stator 51 similar in construction to that shown in Figures 1 and 2, but differing in that there is no constant current imposed on the windings to prevent polarity reversal. Tube 50 is held in position by means of rings 52 and 53 supporting the outer ends of radially disposed springs 55, the inner ends of which are connected to a ring 56 tightly mounted on the tube (see Figure 6). In operation, the rotating field of the stator generates eddy currents in the conductive tube, and the fields accompanying these eddy currents react with the rotating field of the stator to develop a rotating force component on the tube which sets the tube into the desired gyrating mode of vibration.

Figure 9:
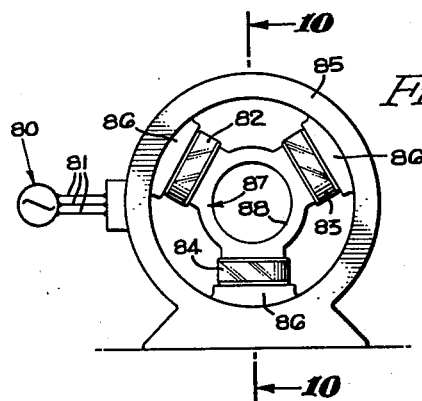
Figure 9 is an end elevational view of a generator in accordance with the invention.
Figure 10:
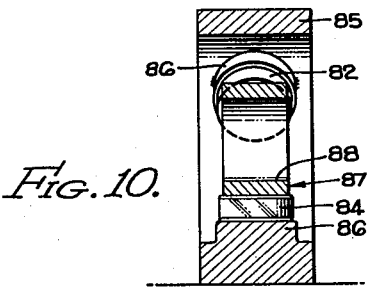
Figure 10 is a vertical longitudinal section taken on line 10—10 of Figure 9.
Figure 11:
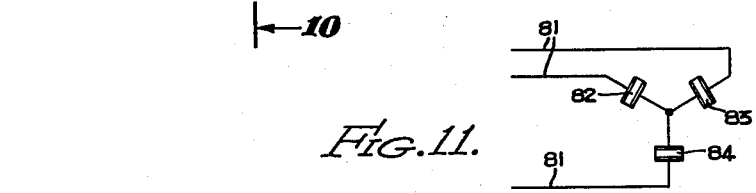
Figure 11 is an electrical circuit for the embodiment of Figures 9 and 10.

A further form of gyratory force generator in accordance with the invention, particularly useful for high frequencies, is shown in Figures 9, 10 and 11. Numeral 80 designates generally a polyphase oscillator (3-phase in this instance) supplying high frequency current through leads 81 to the opposite faces of Y-connected piezoelectric crystals 82, 83 and 84. In the arrangement illustrated particularly in Figures 9 and 11, these crystals are mounted in a cylindrical frame 85 between 120° spaced supports 86 and a hub 87. The latter is shown with a bore 88, to permit it to be fitted onto a cylindrical tube or bar to be used for transmission of the vibrations generated, such bar being omitted from the drawing for simplicity of illustration. It will be seen that the three crystals are subject to the electric fields corresponding to the three phases of the supply current, and the crystals will accordingly expand and contract in sequence. It will be evident that the hub 87 is caused to describe a circular path in response to the sequential expansion and contraction movements of the several crystals.

Figure 12:
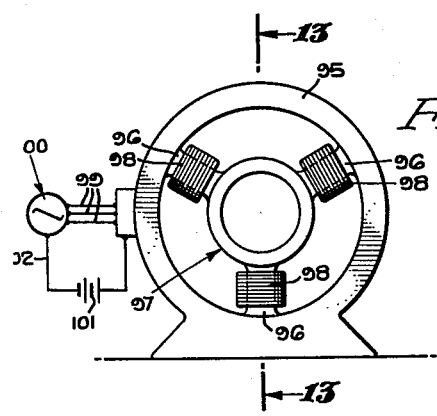
Figure 12 is an end elevational view of a generator in accordance with the invention.
Figure 13:
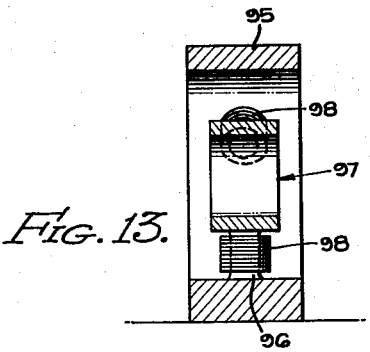
Figure 13 is a vertical longitudinal section taken on line 13—13 of Figure 12.
Figure 14:
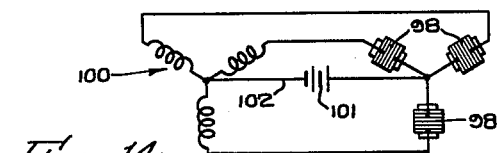
Figure 14 is an electrical circuit for the embodiment of Figures 12 and 13.

Figures 12, 13 and 14 show a magneto-striction type of gyratory force generator somewhat similar to the piezo-electric generator last described. This magneto-striction generator thus has cylindrical frame 95, to the inner surface of which are welded the outer ends of radially disposed magneto-striction bars 96, arranged at 120° spacing, the inner ends of said bars being welded to a central hub 97, which may be mounted on a tube or bar, not shown, used for transmission of the generated gyratory vibrations. Around the magneto-striction bars 96 are magneto-striction windings 98, Y-connected to leads 99 connected to the three-phase oscillation generator designated at 100. The magneto-striction coils are polarized to prevent polarity reversal, which may be accomplished in any convenient manner, for example, by connecting a battery 101 in the neutral line 102 extending between the center points of the Y-connected magneto-striction coil group and the oscillation generator. It will be seen that the magneto-striction coils, energized by the three-phase current, will cause sequence elongation and contraction of the successive magneto-striction bars, causing a small amplitude gyration of the hub 97. Such a magneto-striction rotary sonic generator or transducer differs markedly in operation from that of the longitudinally oscillating type. Whereas the latter operates to an appreciable degree only at or near resonance, the former is found to vibrate powerfully over a much wider band of frequencies, and tuning is found to be relatively uncritical and quite simple to accomplish.

The inertia of the hub as it moves in a rotary path seems to have a fly-wheel effect which tends to maintain the system in motion. Instead of vibrating longitudinally only, the radially positioned nickel bars appear also to flex at the inner ends back and forth in the plane of rotation. The inertial resistance of the mass of the bar to reciprocating movement is overcome not only by its own elastic strength and the influence of the magnetic field but also by the inertia of the heavy hub as the latter moves toward it and then away from it in each cycle. This may be the reason why resonance is much less critical than in an ordinary magneto-striction oscillator.

Figure 15:
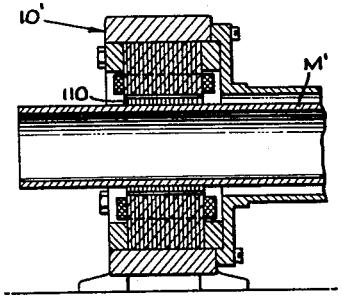
Figure 15 is a longitudinal vertical section of the stator and a portion of the vibratory tubular bar, similar to Figure 1 but showing a modification.

Figure 15 is a fragmentary view of a generator generally similar to that of Figures 1 to 4, but in which the tube M' is or may be of some suitable nonferrous material, a steel or iron laminated sleeve 110 fitted on to said tube within the stator 10', and which becomes in functional effect a portion of the tube, being attracted by the rotating magnetic field set up by the windings in the stator. This sleeve 110 is thus moved about in a circle, and transmits such motion to the tube B', which behaves as does the tube B, which behaves as does the tube B of the embodiment of Figures 1 to 4.

Figure 16:
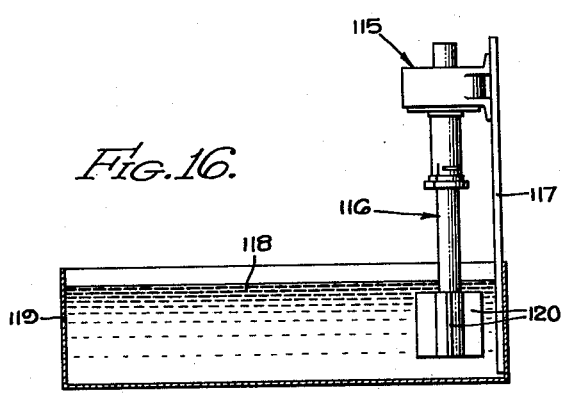
Figure 16 is a view showing a generator of the type of Figure 1 applied to treatment of liquid within a tank, the tank being in section.

In Figure 16 is shown one application of the vibration generator and transmission apparatus of Figures 1 to 4 to a liquid body for treatment of the latter. The numerals 115 and 116 designate generally the generator and gyratory tube of an apparatus such as shown in detail in Figures 1 to 4, the apparatus being vertically mounted on a suitable support 117, so that the lower end portion of the tube 116 extends within a body 118 of liquid to be treated, contained within a tank 119. Suitable paddles 120 on the lower end of tube 116 within the body of liquid produces sonic waves in the liquid body. Simple immersion of the tube 116 within the liquid body is effective, but the paddles 120 provide a liquid coupling means of increased area and are of advantage in generating the desired compression waves within the liquid body.

Figure 17:
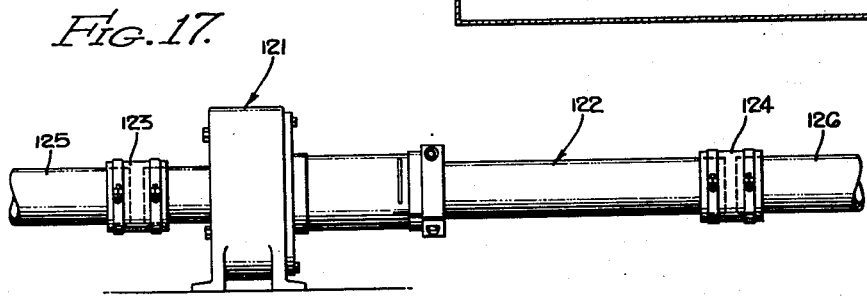
Figure 17 is an elevational view of another application of the invention.

Figure 17 shows an application to such typical purposes as the coagulation or creation of dispersions, or other liquid treatment. A sonic generator and transmission tube of the type of Figures 1 to 4 are shown at 121 and 122, respectively. The tube 122 is flexibly coupled by means of couplings 123 and 124 at opposite ends to inlet and outlet pipes 125 and 126, respectively. Fluids or liquids may thus be passed through the gyratory pipe 122 for continuous treatment, and are subjected to powerful vibrations all along the length of the tube 122. This method is advantageous, since the fluid is subjected to equally powerful vibrations at all points and not merely within a zone adjacent to the oscillator.

Figure 18:
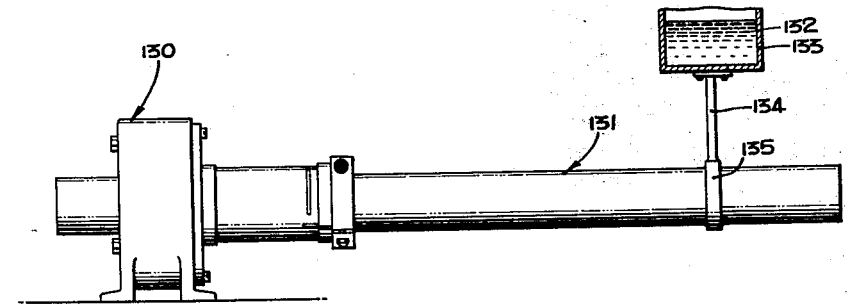
Figure 18 is an elevational view showing still another modification of the invention.

Figure 18 shows still another application. A generator 130 and vibratoid transmission tube 131 are shown, being again of the type of Figures 1 to 4. The gyratory vibrations of the tube 131 are transmitted to a body of liquid 132 within a liquid container 133 by means of a stiff interconnecting link 134 and a ring 135 encircling the tube 131. The ring 135 may be slid along the tube 131 in order to receive gyratory vibration movement of various amplitudes. This feature is of advantage, since in some applications a high displacement is necessary, whereas in others less displacement may be employed, but greater force is of advantage.

The invention has now been described in various forms and applications, which are illustrative and from which its broad scope may be understood. It is of course to be further understood that these are not limitative or a restriction on the scope of the broad invention, excepting as may be fairly construed from the following claims.

I claim:

1. A sonic vibration generator and transmitter comprising: a gyrationally compliant elastic bar having at least a limited linear portion thereof of magnetic material, and means for subjecting said limited linear portion of said bar to a continuously unidirectionally rotating deflecting electromagnetic field force intersecting and turning about an axis parallel to the bar, at a frequency sufficiently high relative to the length of the bar to cause propagation of elastic gyratory waves along the bar, reflection thereof from the ends of the bar, and a resultant gyratory wave pattern along the length of the bar.

2. Apparatus for generating sonic vibrations comprising: a supporting frame; a hub within said frame; spoke-like members connected to said frame and extending radially inwardly therefrom to said hub and connected to the latter so as to support it at a center; oscillators incorporated in said spoke-like members, said oscillators being of a type characterized by alternate expansion and contraction when energized by an undulatory electrical current, and being arranged in said spoke-like members in a manner to cause corresponding alternate elongation and contraction of said members; a source of polyphase undulatory current connected to said oscillators causing them to expand and contract in sequence, so as to move said hub about a closed, substantially circular path; and an elongated elastic bar coupled to said hub for transmission of gyratory wave energy along the bar from said hub.

3. A sonic vibration generator and transmitter comprising: a gyrationally compliant elastic bar having at least a limited linear portion thereof of a material capable of receiving a lateral deflecting thrust in response to an electromagnetic field rotating about an axis parallel to said bar and cutting said portion thereof, and means for subjecting said limited linear portion of said bar to a continuously unidirectionally rotating deflecting electromagnetic field force intersecting and turning about an axis parallel to the bar, at a frequency sufficiently high relative to the length of the bar to cause propagation of elastic gyratory waves along the bar, reflection thereof from the ends of the bar, and a resultant gyratory wave pattern along the length of the bar.

References Cited in the file of this patent

UNITED STATES PATENTS

| | | |
|---|---|---|
| 942,396 | Lincoln | Dec. 7, 1909 |
| 1,082,285 | Peterson | Dec. 23, 1913 |
| 1,552,433 | Hills | Sept. 8, 1925 |
| 1,862,356 | Warren | June 7, 1932 |
| 2,194,410 | Svenson | Mar. 19, 1940 |
| 2,304,793 | Bodine | Dec. 15, 1942 |
| 2,308,298 | Newhouse | Jan. 12, 1943 |
| 2,343,738 | Bechmann et al. | Mar. 7, 1944 |
| 2,393,045 | Hotchner | Jan. 15, 1946 |
| 2,420,793 | O'Connor | May 20, 1947 |
| 2,439,499 | Williams et al. | Apr. 13, 1948 |
| 2,454,620 | Wilde | Nov. 23, 1948 |
| 2,460,919 | Bodine | Feb. 8, 1949 |
| 2,468,515 | Robinson | Apr. 26, 1949 |
| 2,468,837 | Peek | May 3, 1949 |
| 2,511,178 | Roters | June 13, 1950 |
| 2,528,319 | Peterson | Oct. 31, 1950 |

OTHER REFERENCES

"Electronics," "Pin-pointing Ultrasonic Energy," April 1950, pages 84, 85.